(12) United States Patent
Touchette

(10) Patent No.: US 10,618,793 B2
(45) Date of Patent: Apr. 14, 2020

(54) BEVERAGE INFUSER

(71) Applicant: ENHANCED BEVERAGE SOLUTIONS, Savage, MN (US)

(72) Inventor: Neil Touchette, Dundas, MN (US)

(73) Assignee: ENHANCED BEVERAGE SOLUTIONS, Savage, MN (US)

(*) Notice: Subject to any disclaimer, the term of this patent is extended or adjusted under 35 U.S.C. 154(b) by 108 days.

(21) Appl. No.: 15/927,190

(22) Filed: Mar. 21, 2018

(65) Prior Publication Data
US 2019/0292033 A1 Sep. 26, 2019

(51) Int. Cl.
| | |
|---|---|
| *A23L 2/54* | (2006.01) |
| *B01F 3/04* | (2006.01) |
| *B01F 15/00* | (2006.01) |
| *B67D 1/00* | (2006.01) |
| *B67D 1/07* | (2006.01) |
| *B67D 1/12* | (2006.01) |
| *B67D 1/04* | (2006.01) |

(52) U.S. Cl.
CPC .............. *B67D 1/0058* (2013.01); *A23L 2/54* (2013.01); *B01F 3/04* (2013.01); *B01F 15/00* (2013.01); *B67D 1/07* (2013.01); *B67D 1/1252* (2013.01); *B67D 2001/0093* (2013.01); *B67D 2001/0481* (2013.01); *B67D 2001/075* (2013.01)

(58) Field of Classification Search
CPC ............... A23L 2/54; B01F 3/04; B01F 15/00
USPC ..................................................... 261/76, 77
See application file for complete search history.

(56) References Cited

U.S. PATENT DOCUMENTS

| | | |
|---|---|---|
| 5,565,149 A | 10/1996 | Page et al. |
| 9,623,383 B1 | 4/2017 | Kleinrichert |
| 2018/0317524 A1* | 11/2018 | Jennings, III ............. A23L 2/54 |

* cited by examiner

*Primary Examiner* — Robert A Hopkins
(74) *Attorney, Agent, or Firm* — Dewitt LLP; Thomas J. Nikolai

(57) ABSTRACT

Thorough mixing of nitrogen with a beverage to provide a visually interesting and tasty drink is achieved by passing the nitrogen and beverage together through a mixing manifold that is inexpensive to manufacture and easily cleaned and sanitized.

11 Claims, 4 Drawing Sheets

BEVERAGE INFUSER

CROSS-REFERENCED TO RELATED APPLICATIONS

Not applicable

STATEMENT REGARDING FEDERALLY SPONSORED RESEARCH OR DEVELOPMENT

Not applicable

BACKGROUND OF THE INVENTION

I. Field of the Invention

The present invention relates to infusing a liquid, such as a beverage, with a gas such as nitrogen. More specifically, the present invention relates to an improved apparatus that allows a beverage to be infused with nitrogen at the point in time at which the beverage is being dispensed into a glass or mug.

II. Discussion of the Prior Art

For many years, nitrogen has been used in the production and packaging of a variety of beverages, for example beers, to exclude oxygen from the feed water and from contact with the final brewed or bottled product. More recently, it has been found desirable to use nitrogen in a dissolved state in various beverages, including beers and coffee, to influence the presentation of the beverage when the beverage is dispensed into a glass or mug.

Various approaches have been taken in the prior art with varying success. For example, brewers of beer have dissolved nitrogen in the beer placing the beer in a keg because the combination provides a high-quality presentation in the form of a stable white foam head. This is because nitrogen is weakly soluble. When nitrogen has been pre-dissolved in beer at elevated pressures, nitrogen will rapidly precipitate out of solution when the beer flows through a dispensing tap. This precipitation is in the form of a very fine dispersion of small bubbles which float slowly to the surface of the beer. These bubbles are relatively stable because the nitrogen is generally unable to permeate through the bubble wall resulting in a "head" on a nitrogenated beer that lasts longer and is more appealing to consumers.

In addition to nitrogenating a beverage during production, attempts have been made to introduce nitrogen into the beverage during a dispensing operation. These attempts have been criticized for various reasons. First, they have the potential of sparging out desirable flavor constituents of the beverage thereby reducing the beverage's taste and appeal. There is also a risk of bacterial growth in small orifices exposed to the beverage. Such bacterial growth can lead to the contamination of a beverage to be consumed by a person. Effective cleaning of these orifices is difficult. Such systems have also been criticized because they do not allow for finite control of the amount of nitrogen which may or may not dissolve in the beverage. Further, these systems typically do not provide the small-sized bubbles of nitrogen gas needed to influence the presentation of the beverage. Others have tried to solve those problems by using membranes composed of hollow fibers containing nitrogen and regulators to control the pressure at which the nitrogen is presented by the membranes. While these systems, in theory, allow for control of the concentration of nitrogen injected into the beverage, thereby regulating the amount of foam, the cost of such devices and the difficulty presented when cleaning such devices remains problematic.

SUMMARY OF THE INVENTION

The present invention solves each of the foregoing problems by providing an apparatus that allows the concentration of a gas, such as nitrogen, injected into a liquid beverage to be regulated, for such gas to be injected at the point in time at which the beverage is dispensed into a cup, glass or mug, and with a mechanism that is easily cleaned and sanitized.

In one embodiment, the invention comprises an infuser for introducing nitrogen into a beverage. The infuser includes a first inlet adapter coupled to and in fluid communication with a first container holding a supply of the beverage. The infuser also includes a second inlet adapter coupled to and in fluid communication with a second container holding a supply of nitrogen. The infuser further includes an outlet adapter coupled to and in fluid communication with a faucet (tap) controlled by a valve. Positioned between and in fluid communication with the two inlet adapters and the outlet adapter is a manifold. In one embodiment, the manifold comprises a first channel splitter having an inlet port coupled to the first inlet adapter and at least two outlet ports. The manifold also includes a second channel splitter having a second inlet port coupled to the second inlet adapter and having at least two outlet ports. A t-connector having at least four ports is also provided. A first of these four ports of the t-connector is coupled to the outlet adapter.

The manifold of this first embodiment also includes a first fluid channel having a first end coupled to the first of the two outlet ports of the first channel splitter and a second end coupled to a second port of the t-connector. This fluid channel comprises a one-way check valve so that fluid can only flow one way (i.e., from the first channel splitter to the t-connector) through this first fluid channel. The first fluid channel further comprises both a reducer and an expander which change the diameter of the flow path through the first fluid channel creating turbulence advantageous for mixing.

The manifold also includes a second fluid channel. This second fluid channel has a first end coupled to a first of the two outlet ports of the second channel splitter and a second end coupled to a third of the ports of the t-connector. Like the first fluid channel, the second fluid channel comprises a one-way check valve to prevent back flow. The second fluid channel also includes a reducer and an expander to create turbulence in the fluid flowing through the second channel.

The manifold also includes a third fluid channel. The third fluid channel comprises a third channel splitter, this time having two inlet ports and at least one outlet port. The third fluid channel has a first branch comprising a one-way check valve extending between the second of the outlet ports of the first channel splitter and a first of the inlet ports of the third channel splitter. The third fluid channel also has a second branch comprising a one-way check valve extending between a second of the outlet ports of the second channel splitter and a second of the inlet ports of the third channel splitter. These check valves again prevent back flow. The third fluid channel also has a merged section (main branch) extending between the outlet port of the third channel splitter and the fourth of the ports of the t-connector. This merged section (main branch) also includes a reducer and expander creating turbulence advantageous for mixing. Nitrogen mixes with the beverage in several portions of the manifold. Such mixing occurs in the third channel splitter and along the merged section (main branch) of the third fluid channel. Such mixing also occurs where the first, second and third fluid channels come together in the t-connector. The design of the manifold insures that the beverage and nitrogen are thoroughly mixed as they exit the manifold and travel from the manifold to the faucet (tap).

Travel of nitrogen from the second container to the manifold can be controlled by a standard regulator. Also, the regulator (or the line) may be equipped with a valve to turn off flow or to adjust the flow from the source of nitrogen to the manifold. A similar valve may be provided to control flow from the container holding a supply of the beverage to the manifold.

Further, a pipeline may be provided between the container holding the nitrogen and the container holding the beverage permitting a certain quantity of nitrogen to be infused into the beverage prior to the time the beverage passes through the manifold. This pipeline will typically include a regulator, as well as a valve, to control the quantity of nitrogen injected into the beverage container (vessel).

Various modifications to the construction of the manifold are contemplated by the present invention. For example, two such manifolds may be provided to further enhance mixing of nitrogen with the beverage. Likewise, a manifold with additional fluid channels may be provided.

BRIEF DESCRIPTION OF THE DRAWINGS

The foregoing features, objects and advantages of the invention will become apparent to those skilled in the art from the following detailed description of the preferred embodiment, especially when considered in conjunction with the accompanying drawings in which like numerals in the several views refer to corresponding parts.

DETAILED DESCRIPTION

Figure 1:
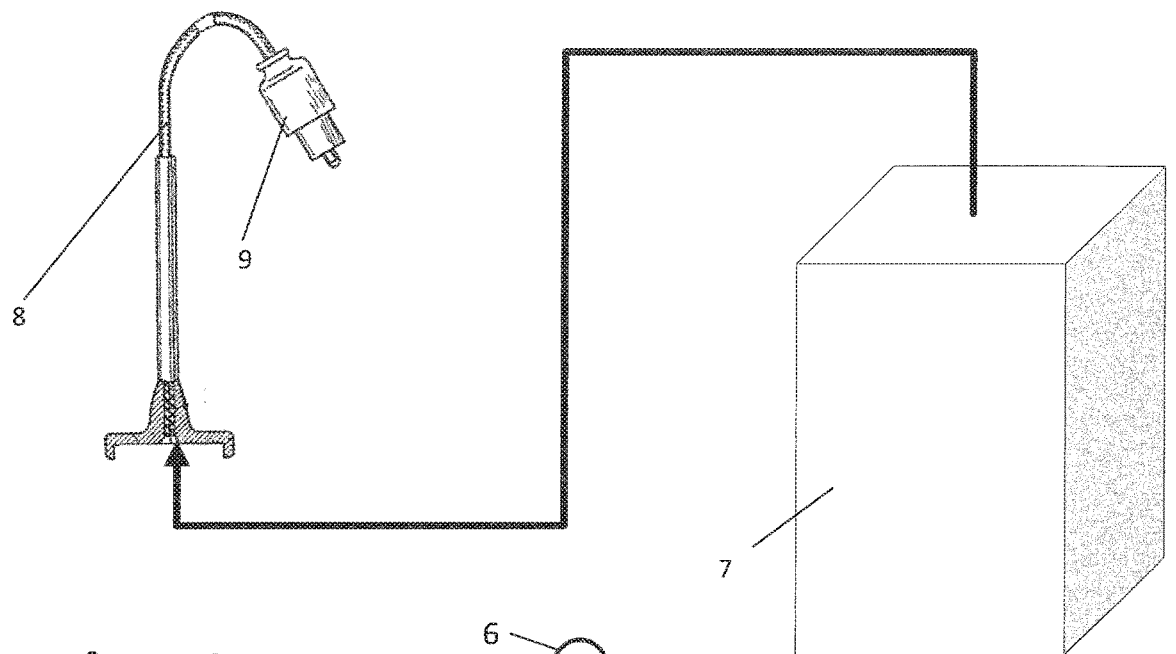
FIG. 1 is a schematic diagram of the infusion apparatus of the present invention.
Figure 1:
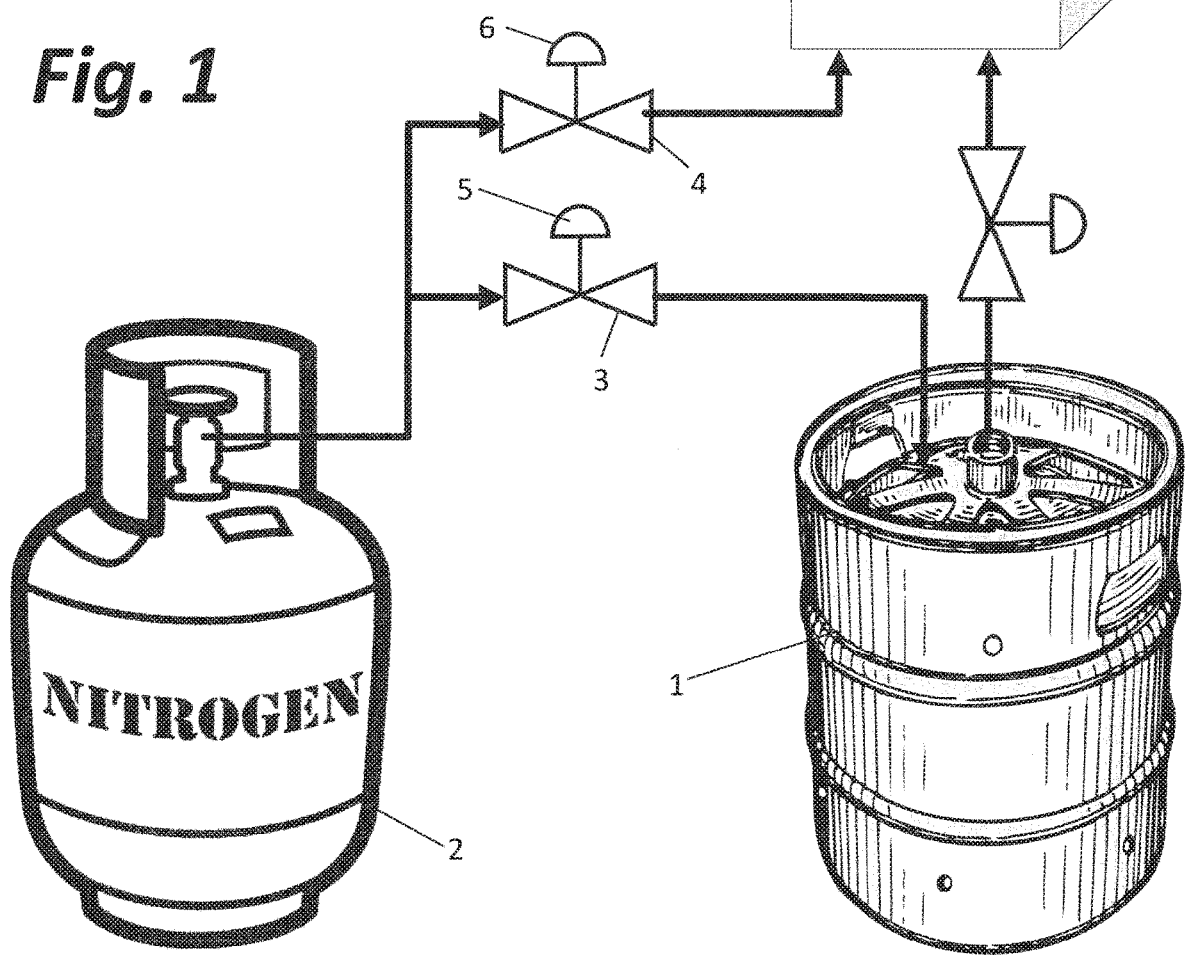

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

As illustrated in FIG. 1, the infusion system of the present invention includes a vessel or container 1 adapted to hold a large quantity of a beverage. The beverage may be coffee, tea, beer, any fruit juice, lemonade, wine, spirits or any soft drink. The infusion system also includes a second vessel or container 2 holding a supply of nitrogen.

As shown in FIG. 1, a pipeline extends from the vessel 2 to the vessel 1 such that nitrogen may be permitted to flow between the vessel 2 and the vessel 1 to pre-charge the beverage with some quantity of nitrogen. This pipeline includes a regulator 3 and a valve 5 to control delivery of nitrogen to the vessel 1.

Figure 2:
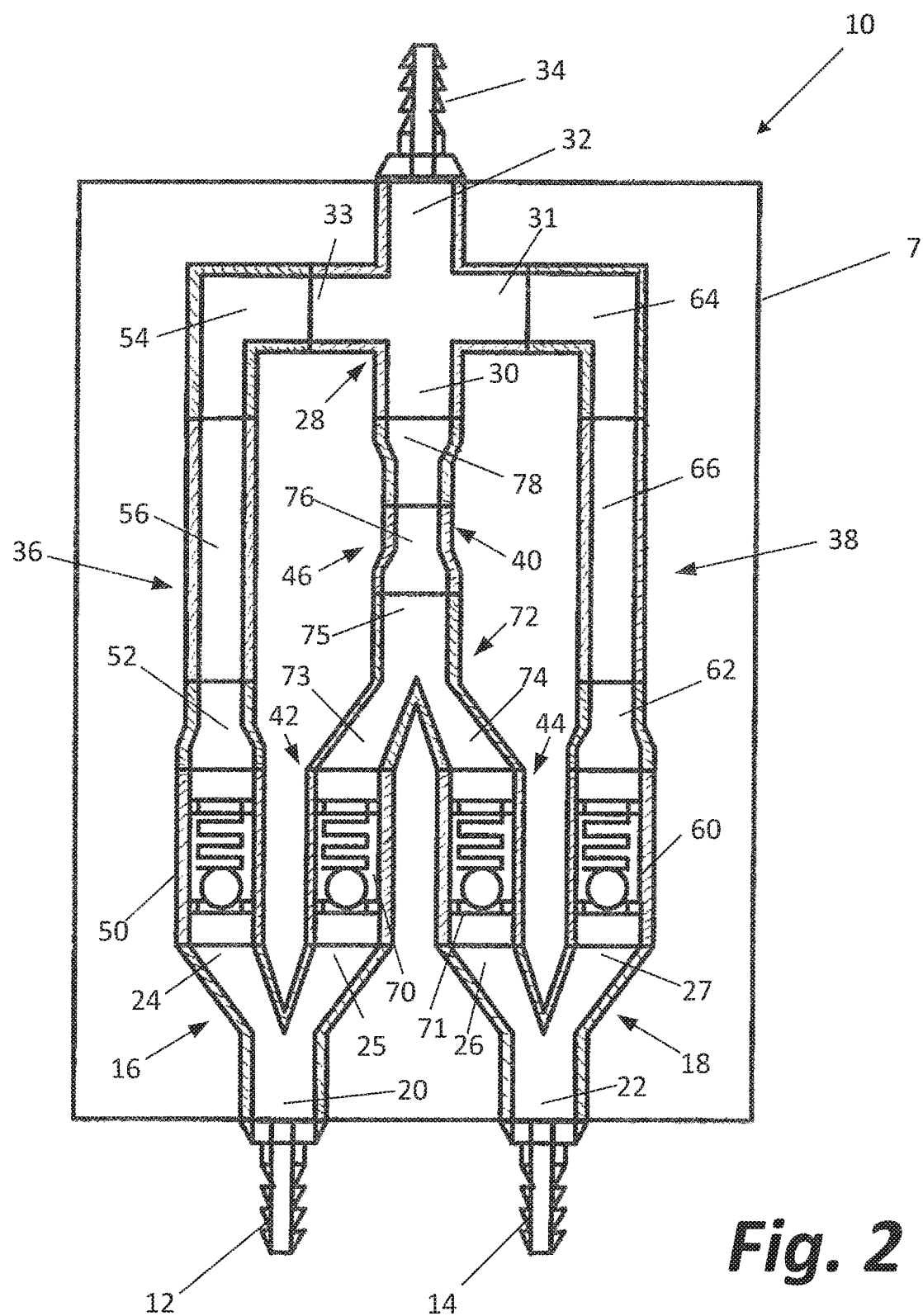
FIG. 2 is a schematic diagram of a first embodiment of the manifold of the system shown in FIG. 1.
Figure 3:
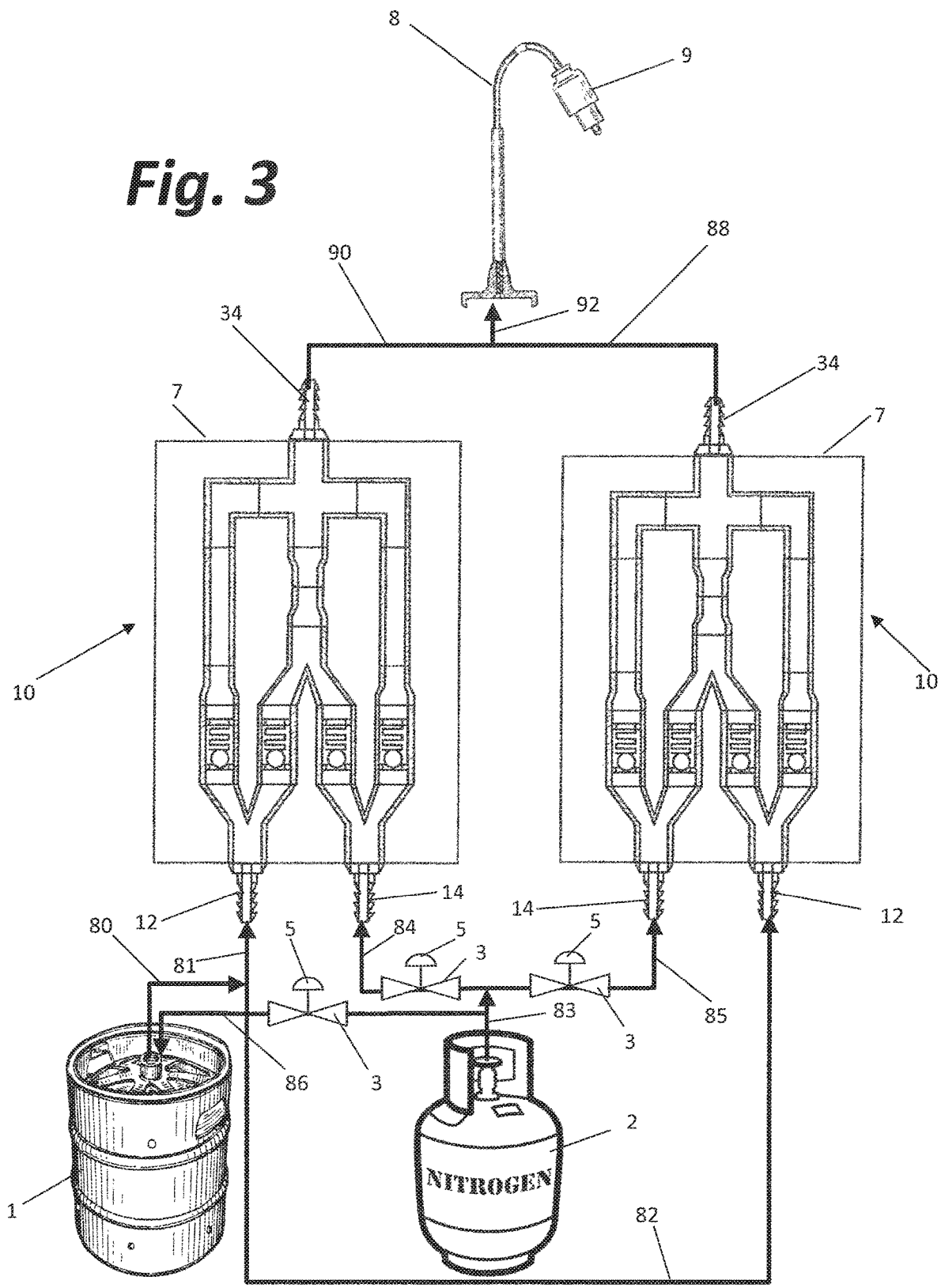
FIG. 3 is a schematic diagram of the embodiment of FIG. 1 which is equipped with two manifolds rather than one.
Figure 4:
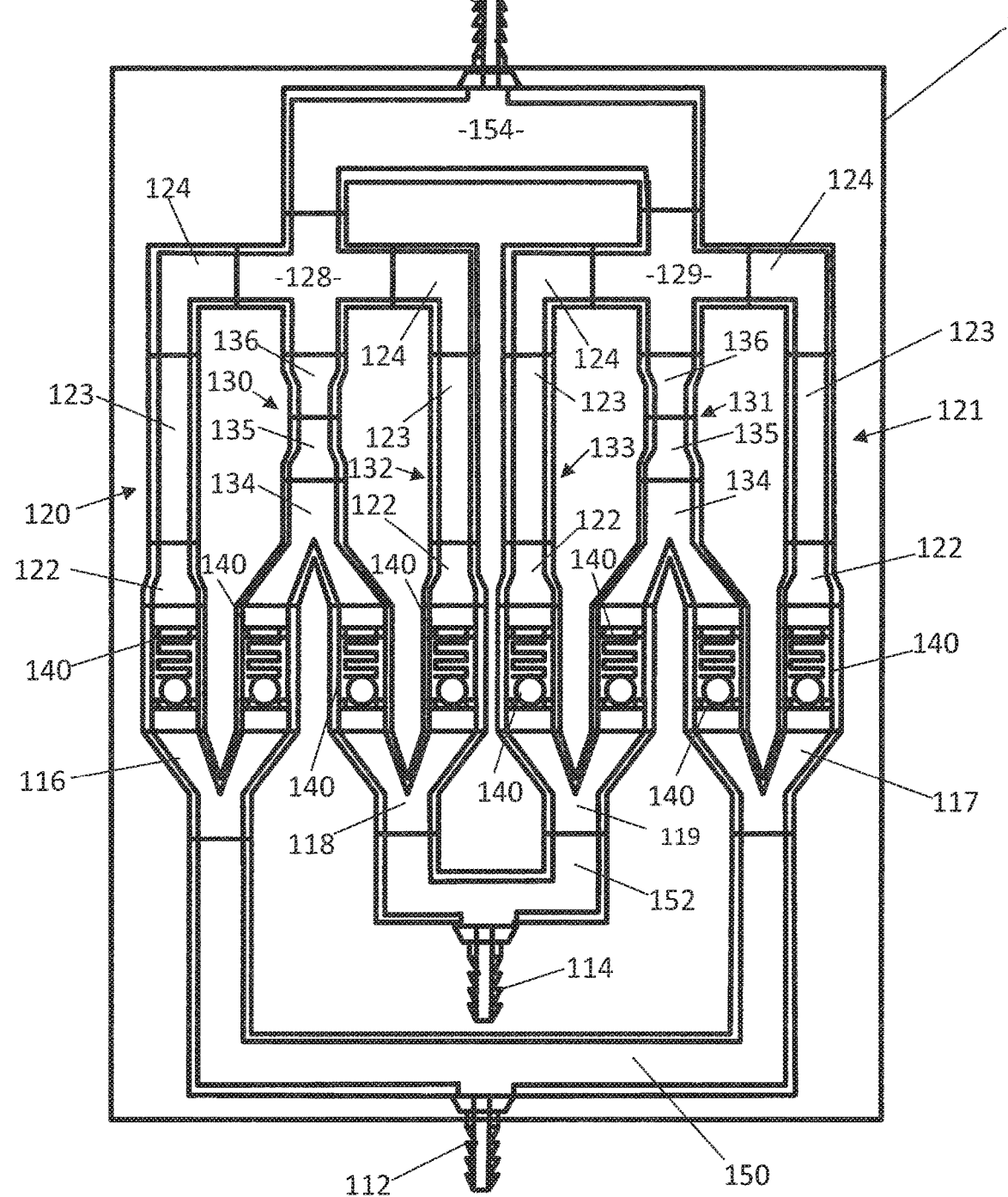
FIG. 4 is an alternative embodiment of the manifold of the infusion system of FIG. 1.

FIG. 1 also shows a second pipeline extending from the nitrogen container. This second pipeline places the nitrogen container or vessel 2 in fluid communication with a manifold 10 housed within a manifold housing 7. Various versions of the manifold 10 are illustrated in FIGS. 2-4. This second pipeline also includes a regulator 4 and a valve 6 to control the delivery of nitrogen to the manifold 10.

A third pipeline is also shown in FIG. 1 leading from the vessel 1 to the manifold 10 within housing 7. While no valve is shown in the drawing, one skilled in the art will appreciate that a valve could easily be added to this pipeline to insure that beverage is only dispensed from the vessel 1 when and at a rate desired. Also, a regulator may also be employed in this line since container 1 is pressurized. If the container 1 is not pressurized, the line may include a pump driven by a motor.

After the nitrogen and beverage are merged together in the manifold 10 housed within housing 7, the mixture of nitrogen and beverage exits the manifold through a fourth pipeline and is delivered to a tap which comprises a faucet 8 and a valve 9. The tap is used to dispense a quantity of the nitrogenated beverage mixture into a drinking cup, glass, mug or any other suitable container.

A first embodiment of the manifold 10 within the housing 7 is illustrated in FIG. 2. As shown in FIG. 2, a first inlet adapter 12 and a second inlet adapter 14 are provided. One of these inlet adapters is in fluid communication with the vessel 2 containing the nitrogen. The other is in fluid communication with vessel 1 containing a supply of the beverage.

The manifold illustrated in FIG. 2 also includes a first channel splitter 16 and a second channel splitter 18. The first channel splitter has an inlet port 20 coupled to the first inlet adapter 12. The second channel splitter 18 has a first inlet port 22 coupled to the second inlet adapter 14. As shown in FIG. 2, each of the first and second channel splitters have two outlet ports. The first channel splitter has outlet ports 24 and 25. The second channel splitter has outlet ports 26 and 27.

Positioned near the top of the manifold 10 is a t-connector 28. The t-connector 28 is shown as including four ports 30-33. Ports 30, 31 and 33 are inlet ports. Port 32 is an outlet port connected to an outlet adapter 34. The outlet adapter 34 is coupled to the pipeline that carries the nitrogenated beverage mixture to the tap (faucet) 8.

The manifold 10 illustrated in FIG. 2 further includes three fluid flow channels 36, 38 and 40. The first fluid flow channel 36 extends between outlet port 24 of the first channel splitter and inlet port 33 of the t-connector 28. The first fluid flow channel 36 comprises a one-way check valve to ensure that fluid only flows in one direction (from the first channel splitter 20 to the t-connector 28) through the first fluid flow channel 36. In addition to the one-way check valve 50, the first fluid flow channel has a reducer 52 and an expander 54. The reducer 52 and expander 54 are coupled together by a tube or pipe 56. The reducer serves to reduce the inside diameter of the first fluid flow channel 36 and the expander 54 serves to return the diameter to its original size. This arrangement causes substantial turbulence in the flow through the first fluid flow channel 36 which aids in mixing that occurs in the t-connector 28.

As shown in FIG. 2, the manifold 10 further includes a second fluid flow channel 38 extending between the outlet port 27 of the second channel splitter 18 and the inlet port 31 of the t-connector 28. Like the first fluid flow channel, the second fluid flow channel 38 includes a one-way check valve 60 so that fluid can only flow in the direction from the second channel splitter 22 toward the t-connector 28. The second fluid flow channel 38 also includes a reducer 62, an expander 64 and a tube 66 extending between the reducer 62 and expander 64. Again, this arrangement creates substantial turbulence. As shown in FIG. 2, the expanders 54 and 64 are each configured as an elbow to make connections of the first and second fluid flow channels 36/38 to the t-connector 28. This also contributes to turbulence and mixing in the t-connector 28.

The third fluid flow channel 40 illustrated in FIG. 2 has a first branch 42, a second branch 44, which merge together and form a merged or main branch 46. Each of the first and second branches 42/44 have a check valve 70/71. The first and second branches 42 and 44 are brought together to form the main branch 46 by a third channel splitter 72. The third channel splitter has two inlets 73 and 74. Inlet 73 is coupled to the first branch 42 and inlet 74 is coupled to the second branch 44. The main branch 46 extends from the outlet 75 of the third channel splitter 72 to the input port 30 of the t-connector 28. The main branch 46 of the third fluid flow channel 40 comprises a reducer 76 and an expander 78. Mixing of beverage with nitrogen occurs in the third channel splitter 72 and along the length of main branch 46, as well as in the t-connector 28.

In summary, the check valves 50, 60, 70 and 71 prevent any reverse flow of beverage, nitrogen or the mixture of the beverage and the nitrogen. Also, mixing of nitrogen and beverage occurs in the manifold 10 at various locations including the third channel splitter 72, the main branch 46 of the third fluid flow channel 40 and in the t-connector 28. As such, the nitrogen and beverage are thoroughly mixed as they exit the manifold 10 through outlet adapter 34 and travel from the outlet adapter 34 to the tap (faucet) 8.

FIG. 3 shows an alternative embodiment which again includes a vessel 1 containing beverage, a vessel 2 containing nitrogen, and a tap/faucet 8 controlled by a valve 9. In the embodiment of FIG. 3, two manifolds of the type described above with reference to FIG. 2 are provided. In the embodiment of FIG. 3, beverage is supplied to the inlet ports 12 of each of the two manifolds 10 by a first pipeline including a main branch 80 and secondary branches 81 and 82. Branch 81 extends from the main branch 80 to the inlet adapter 12, one of the manifolds 10 and a branch 82 extends from the main branch 80 to the inlet adapter 12 of the second of the manifolds 10. Likewise, nitrogen is supplied to each of the two manifolds 10 via a pipeline having a main branch 83 and secondary branches 84 and 85 that extend from the main branch 83 to the two input adapters 14 of the two manifolds 10. Nitrogen can also be supplied via a secondary branch 86 extending from the main branch 83 to the vessel 1 containing the beverage. Various regulators and valves 3/5 may be employed to control the delivery of nitrogen to the inlet adapters 14 of the two manifolds 10 and to the vessel 1. Also, a pipeline extends from each of the two output adapters 34 to the tap/faucet 8. This pipeline includes branches 88 and 90 and a main branch 92.

FIG. 4 shows an alternative manifold 100 that may be positioned inside housing 7. Like the manifold 10, manifold 100 mixes beverage and gas entering the manifold through inlet adapters 112 and 114 before the mixture exits the manifold through outlet adapter 160. While it makes no difference which of the inlet adapters 112/114 is connected to the gas source and which is connected to the beverage source, in the discussion below, the gas enters through inlet adapter 112 and the beverage enters through inlet adapter 114.

Gas entering through inlet adapter 112 passes through conduit 150 to two channel splitters 116 and 117. Beverage entering through inlet adapter 114 passes through conduit 152 to two channel splitters 118 and 119.

The channel splitters 116 and 117 further divide the gas so the gas flows through four separate channels, namely, channels 120, 121, 130 and 131. Similarly, the channel splitters 118 and 119 divide the beverage so that the beverage flows through four separate channels, namely, channels 132, 133, 130 and 131. Channels 120, 130 and 132 ultimately merge back together in a t-connector 128. Channels 121, 131 and 133 ultimately merge back together in a second t-connector 129. Material flows from the two t-connectors 128 and 129 to the outlet connector 160 through a conduit 154.

Channels 120 and 121 carry only gas. Channels 120 and 121 each include a one-way check valve 140 to prevent back flow. Channels 120 and 121 each further include a reducer 122, tubing 123 and an elbow-shaped expander 124. This arrangement causes turbulence in the flow of gas and also enables an easy coupling of the channel 120 to t-connector 128 and channel 121 to t-connector 129.

In a similar fashion, channels 132 and 133 carry only beverage. Channel 132 carries beverage from the channel splitter 118 to the t-connector 128 and channel 133 carries beverage from the channel splitter 119 to the t-connector 129. Each of channels 132 and 133 comprises a one-way check valve 140 to prevent back flow, a restrictor 122, tubing 123 and an expander 124, which is shown to be elbow shaped. This arrangement causes turbulence in the flow of the beverage and enables an easy connection to the associated t-connector.

The channels 130 and 131 carry both beverage and gas. In the case of channel 130, gas is supplied via a first branch extending from channel splitter 116 and beverage is supplied via a second branch extending from the channel splitter 118. Each of these branches comprise a one-way check valve 140 to prevent back flow. The two branches are merged together by a channel splitter 134 to form a main branch extending from the channel splitter 134 to t-connector 128. Similarly, and in the case of channel 131, gas is supplied via a first branch extending from channel splitter 117 and beverage is supplied via a second branch extending from the channel splitter 119. Each of these branches again comprises a one-way check valve 140 to prevent back flow. The two branches are merged together by a channel splitter 134 to form a main branch extending between the channel splitter 134 and the t-connector 129. The main branches of flow channels 130 and 131 each comprise a reducer 135 and an expander 136 to promote turbulence and mixing.

In the manifold 100, mixing of gas (e.g., nitrogen) and the beverage occurs (a) in each of channel splitters 134, (b) along the main branch of channels 130 and 131, (c) in each of the t-connectors 128 and 129, and (d) in the conduit 154. As such, the material exiting through adapter 160 to the faucet (tap) 8 is thoroughly mixed.

No matter which version of the manifold is employed, construction of the manifold can occur in various ways. For example, the various parts may be molded as one. Alternatively, the manifold can be constructed using various push-fit-snap-together components such as those available from John Guest USA Inc., 180 Passaic Avenue, Fairfield, N.J. 07004.

Likewise, various modifications to the manifold can be made without deviating from the invention. Some back-flow control should be provided. Also, connectors other than the t-shaped and y-shaped connectors shown may be used to bring flow paths together. Likewise, desirable flow characteristics may be achieved using structures other than the reducers and expanders shown. Additional valves and regulators may be employed to provide greater control of the system. Also, the valves employed may be equipped with a solenoid or some other actuator, which may be coupled to an electronic controller for automated control. Sensors may also be provided to provide feedback to the controller. The controller may employ these feedback signals from sensors to send control signals to the valve actuators. All of these changes and modifications are contemplated to fall within the scope of the present invention.

This invention has been described herein in considerable detail in order to comply with the patent statutes and to provide those skilled in the art with the information needed to apply the novel principles and to construct and use embodiments of the example as required. However, it is to be understood that the invention can be carried out by specifically different devices and that various modifications can be accomplished without departing from the scope of the invention itself.

What is claimed is:

1. An infuser for introducing a gas into a beverage comprising:
   a) a first inlet adapter coupled to and in fluid communication with a first container holding a supply of a beverage;
   b) a second inlet adapter coupled to and in fluid communication with a second container holding a supply of a gas;
   c) an outlet adapter coupled to and in fluid communication with a faucet controlled by a valve; and
   d) a manifold assembly comprising:
      i) a first channel splitter having an inlet port coupled to said first inlet adapter and at least two outlet ports;
      ii) a second channel splitter having a second inlet port coupled to said second inlet adapter and a least two outlet ports;
      iii) a t-connector having at least four ports, a first of said ports of the t-connector coupled to the outlet adapter;
      iv) a first fluid channel having a first end coupled to a first of the two outlet ports of the first channel splitter and a second end coupled to a second of said ports of the t-connector, said first fluid channel comprising a one-way check valve, a reducer and an expander;
      v) a second fluid channel having a first end coupled to a first of the two outlet ports of the second channel splitter and a second end coupled to a third of said ports of the t-connector, said second fluid channel comprising a one-way check valve, a reducer and an expander; and
      vi) a third fluid channel comprising a third channel splitter having at least two inlet ports and at least one outlet port, a first branch comprising a one-way check valve extending between a second of the outlet ports of the first channel splitter and a first of the inlet ports of the third channel splitter, a second branch comprising a one-way check valve extending between a second of the outlet ports of the second channel splitter and a second of the inlet ports of the third channel splitter, and a merged section extending between the outlet port of the third channel splitter and a fourth of said ports of said t-connector, said merged section including a reducer and an expander.

2. The infuser of claim 1 wherein the second inlet adapter is coupled to the second container by a pipeline including a regulator.

3. The infuser of claim 1 wherein the second inlet adapter is coupled to the second container by a pipeline comprises a valve adapted to control the flow of a gas from the second container to the second inlet adapter.

4. The infuser of claim 1 wherein the first container is in fluid communication with the second container via a pipeline adapted to transfer a gas from the second container to the first container.

5. The infuser of claim 4 wherein the pipeline comprises a regulator.

6. The infuser of claim 5 wherein the pipeline comprises a valve for controlling the flow of a gas from the second container to the first container.

7. The infuser of claim 1 wherein said manifold is contained within a housing.

8. The infuser of claim 1 wherein the manifold is assembled from a plurality of push fit components.

9. The infuser of claim 1 wherein said gas is nitrogen.

10. The infuser of claim 1 wherein said infuser has a plurality of manifolds.

11. The infuser of claim 1 wherein said manifold further comprises:
   viii. a fourth channel splitter having an inlet port coupled to said first inlet adapter and at least two outlet ports;
   ix. a fifth channel splitter having an inlet port coupled to said second inlet adapter and a least two outlet ports;
   x. a second t-connector having at least four ports, a first of said ports of the second t-connector coupled to the outlet adapter;
   xi. a fourth fluid channel having a first end coupled to a first of the two outlet ports of the fourth channel splitter and a second end coupled to a second of said ports of the second t-connector, said fourth fluid channel comprising a one-way check valve, a reducer and an expander;
   xii. a fifth fluid channel having a first end coupled to a first of the two outlet ports of the fifth channel splitter and a second end coupled to a third of said ports of the second t-connector, said fifth fluid channel comprising a one-way check valve, a reducer and an expander; and
   xiii. a sixth fluid channel comprising a sixth channel splitter having at least two inlet ports and at least one outlet port, a first branch comprising a one-way check valve extending between a second of the outlet ports of the fourth channel splitter and a first of the inlet ports of the sixth channel splitter, a second branch comprising a one-way check valve extending between a second of the outlet ports of the fifth channel splitter and a second of the inlet ports of the sixth channel splitter, and a merged section extending between the outlet port of the sixth channel splitter and a fourth of said ports of said second t-connector, said merged section including a reducer and an expander.

* * * * *